US011187292B2

(12) United States Patent
Song

(10) Patent No.: US 11,187,292 B2
(45) Date of Patent: Nov. 30, 2021

(54) BRAKE ACTUATOR AND ELECTROMECHANICAL BRAKE USING THE SAME AND CONTROL METHOD THEREOF

(71) Applicant: MANDO CORPORATION, Pyeongtaek-si (KR)

(72) Inventor: Joon-Kyu Song, Seongnam-si (KR)

(73) Assignee: Mando Corporation, Pyeongtaek-si (KR)

( * ) Notice: Subject to any disclaimer, the term of this patent is extended or adjusted under 35 U.S.C. 154(b) by 181 days.

(21) Appl. No.: 16/534,215

(22) Filed: Aug. 7, 2019

(65) Prior Publication Data

US 2020/0049215 A1 Feb. 13, 2020

(30) Foreign Application Priority Data

Aug. 10, 2018 (KR) ........................ 10-2018-0093838

(51) Int. Cl.
*B60T 13/74* (2006.01)
*F16D 65/18* (2006.01)
*F16D 55/226* (2006.01)
*B60T 8/17* (2006.01)

(52) U.S. Cl.
CPC ................ *F16D 65/18* (2013.01); *B60T 8/17* (2013.01); *F16D 55/226* (2013.01)

(58) Field of Classification Search
CPC ....... F16D 65/18; F16D 65/182; B60T 13/741
USPC ............................. 188/72.1, 106 R, 156–164
See application file for complete search history.

(56) References Cited

U.S. PATENT DOCUMENTS

| | | | | |
|---|---|---|---|---|
| 6,153,988 A * | 11/2000 | Reimann | F16D 65/18 188/162 |
| 9,068,613 B2 * | 6/2015 | Baehrle-Miller | F16D 65/18 |
| 9,447,830 B2 * | 9/2016 | Bull | F16D 65/18 |
| 9,447,831 B2 * | 9/2016 | Goh | F16D 65/18 |
| 10,486,673 B2 * | 11/2019 | Sussek | B60T 17/221 |
| 2003/0205437 A1 * | 11/2003 | Drennen | F16D 65/18 188/157 |
| 2009/0223752 A1 * | 9/2009 | Kim | B60T 13/741 188/72.1 |

(Continued)

FOREIGN PATENT DOCUMENTS

| | | |
|---|---|---|
| JP | 11-148522 A | 6/1999 |
| KR | 10-2008-0053723 A | 6/2008 |

(Continued)

OTHER PUBLICATIONS

Korean Office Action dated Sep. 30, 2019 issued in Korean Patent Application No. 10-2018-0093838.

*Primary Examiner* — Christopher P Schwartz
(74) *Attorney, Agent, or Firm* — Morgan, Lewis & Bockius LLP

(57) ABSTRACT

Disclosed herein are a brake actuator and an electromechanical brake using the brake actuator and a control method thereof. The brake actuator provided in a disc brake to press or release a piston and controlled by an electrical signal includes a first actuator including a first power transmission unit configured to transmit power to the piston side; and a second actuator including a second power transmission unit configured to transmit power to the piston side; wherein the first and second power transmission units are arranged coaxially.

19 Claims, 10 Drawing Sheets

(56) References Cited

U.S. PATENT DOCUMENTS

| | | | | |
|---|---|---|---|---|
| 2014/0034432 | A1* | 2/2014 | Bull | B60T 13/741<br>188/106 R |
| 2016/0239094 | A1* | 8/2016 | Divakara | G06F 3/0304 |
| 2016/0290424 | A1* | 10/2016 | Gutelius | F16D 65/18 |
| 2018/0073585 | A1* | 3/2018 | Masuda | B60T 13/746 |
| 2019/0152461 | A1* | 5/2019 | Poertzgen | B60T 13/741 |
| 2019/0170200 | A1* | 6/2019 | Isono | F16D 65/183 |

FOREIGN PATENT DOCUMENTS

| | | | |
|---|---|---|---|
| KR | 10-0957329 | B1 | 5/2010 |
| KR | 10-1511437 | B1 | 4/2015 |
| KR | 10-2017-0092198 | A | 8/2017 |

* cited by examiner

【FIG. 1】
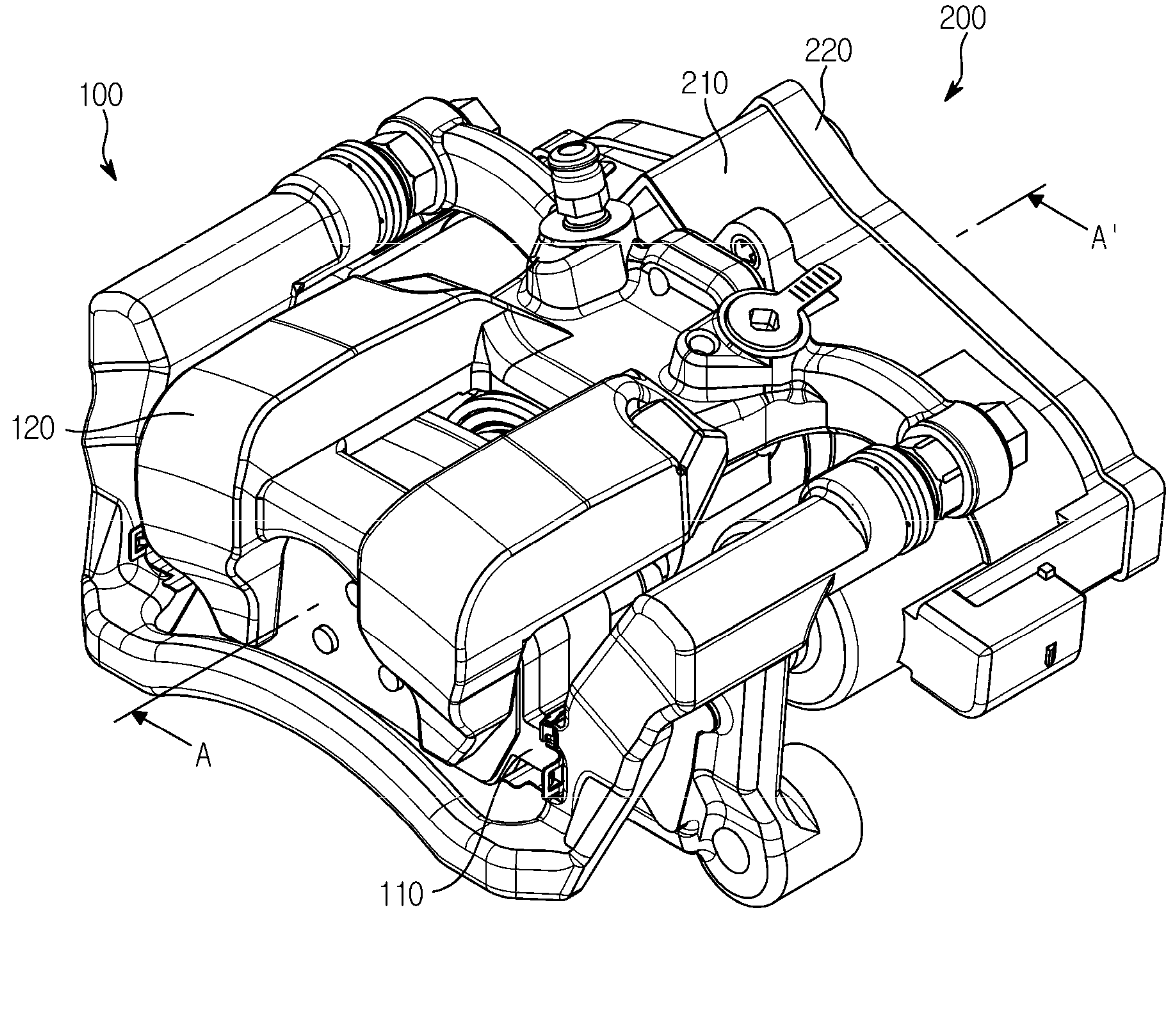

【FIG. 2】
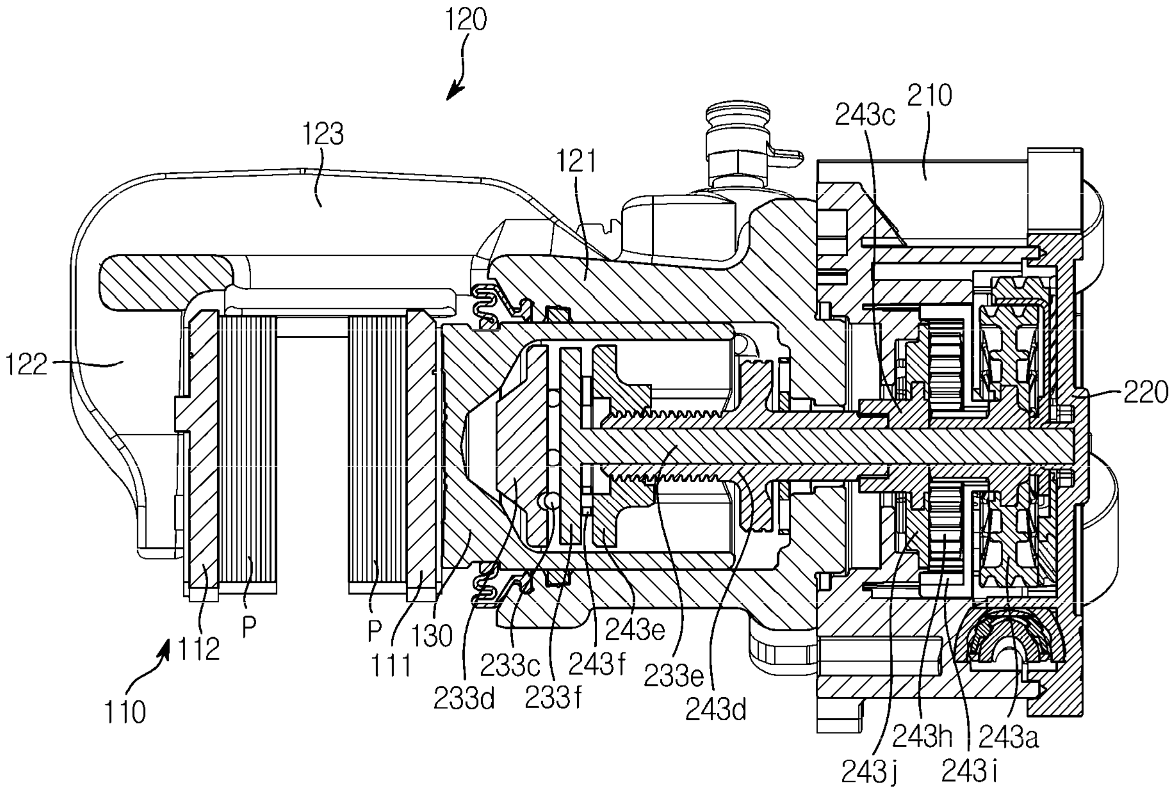

【FIG. 3】
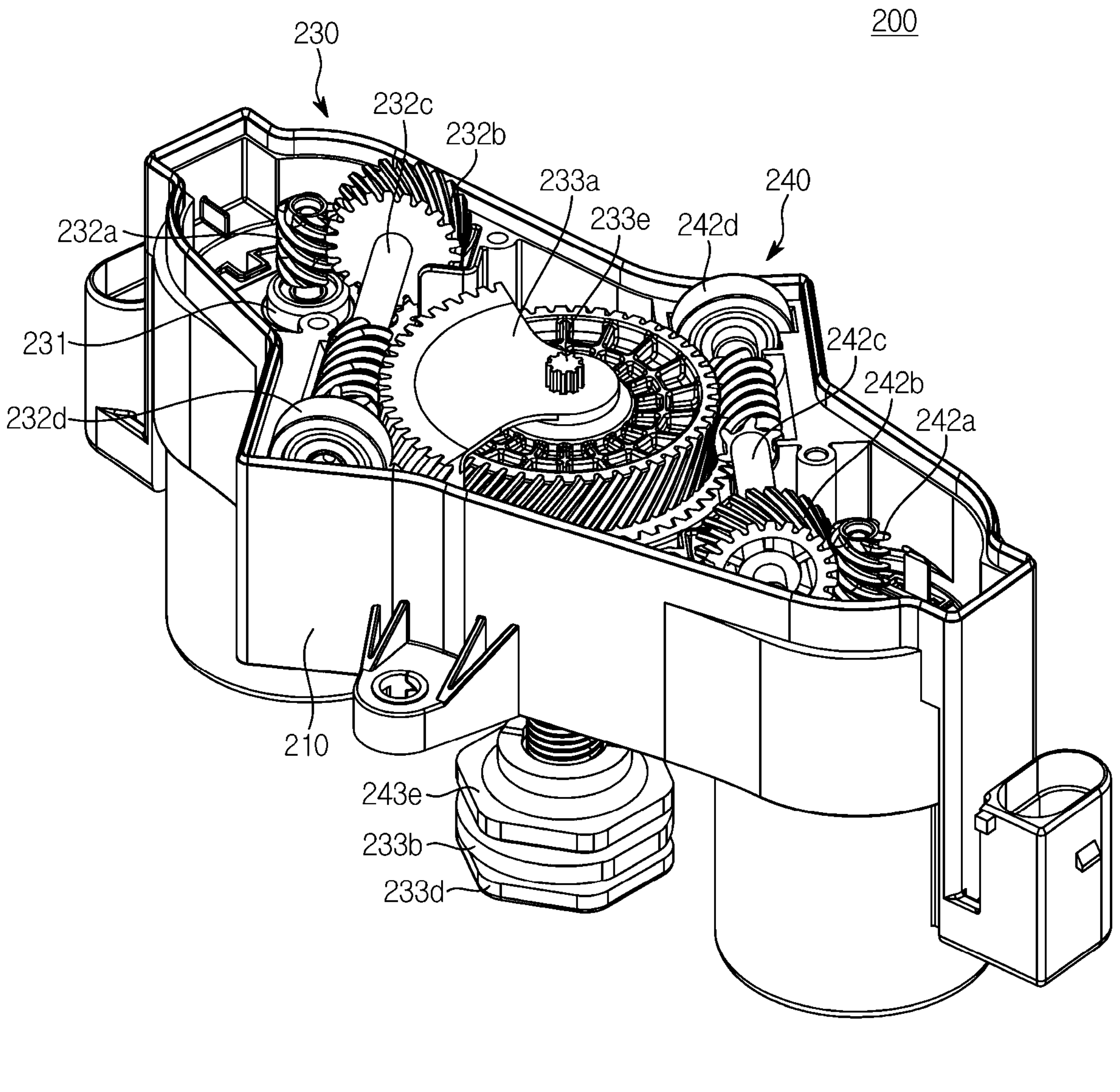

【FIG. 4】
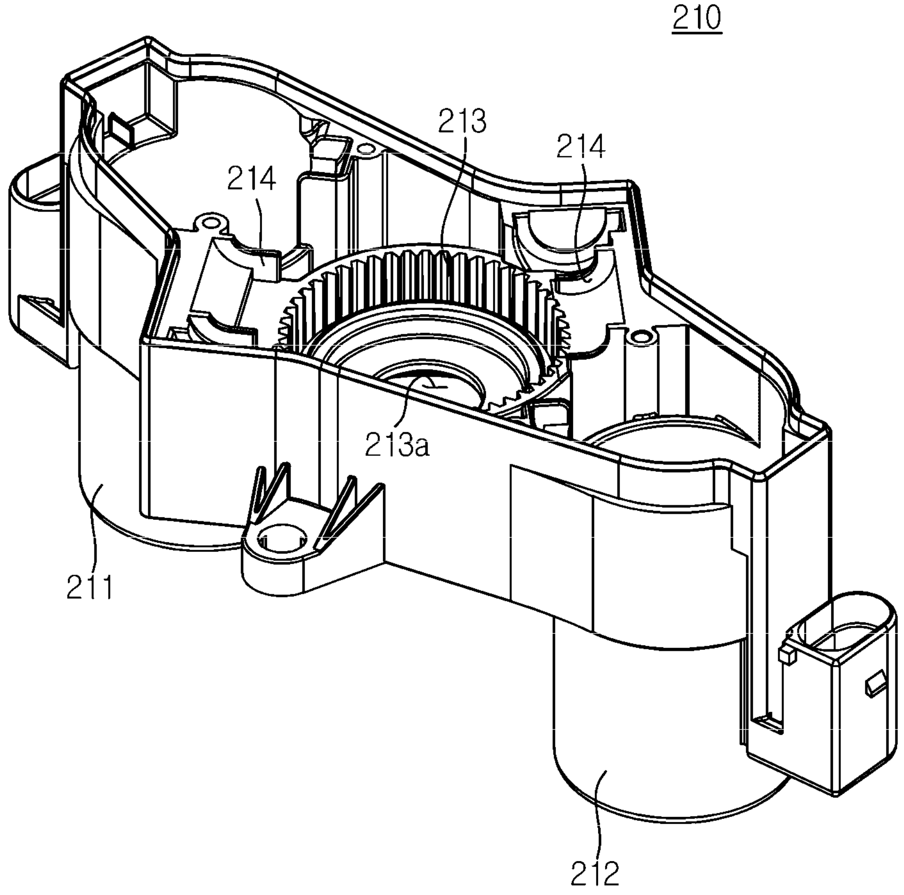

【FIG. 5】
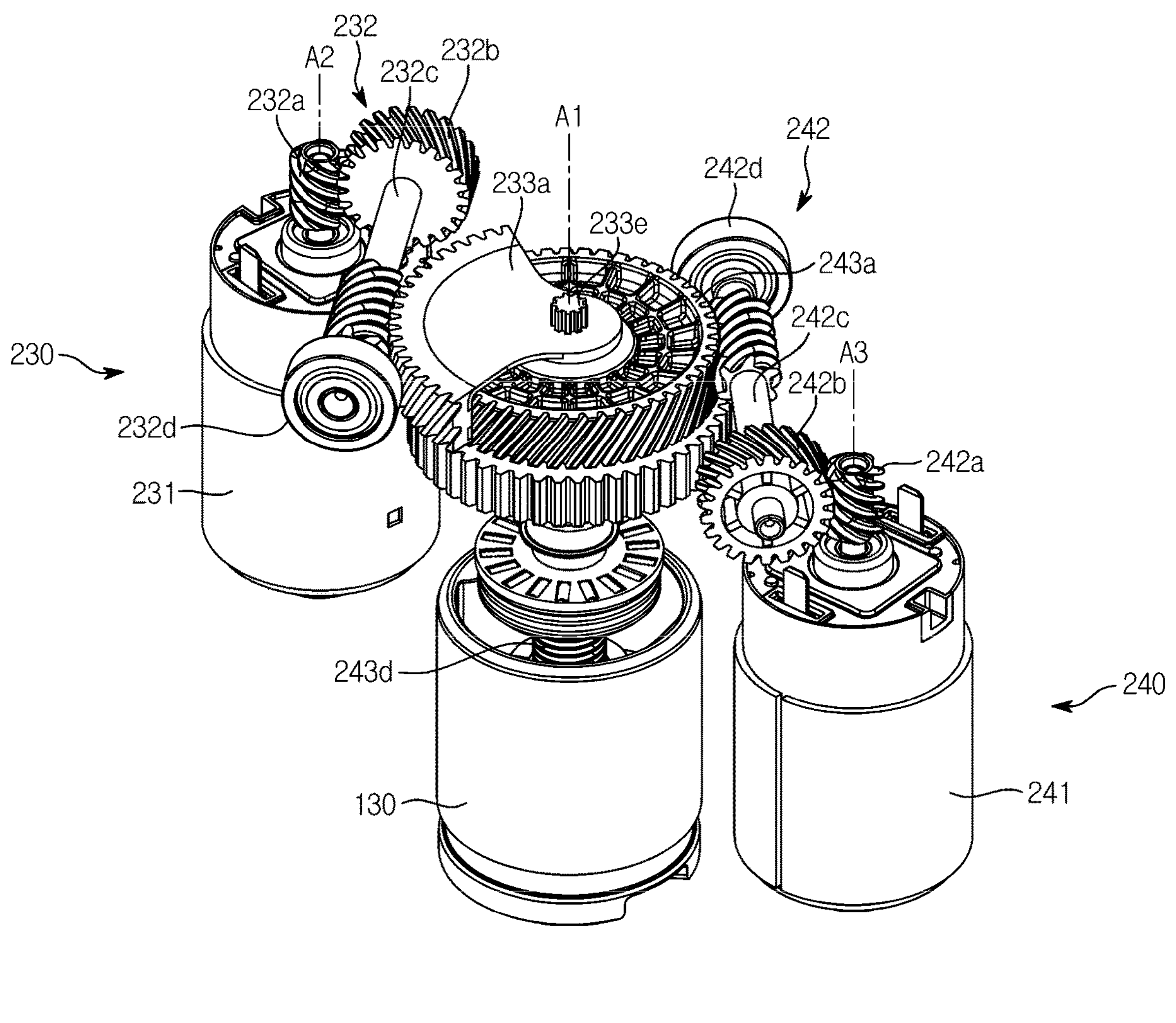

【FIG. 6】
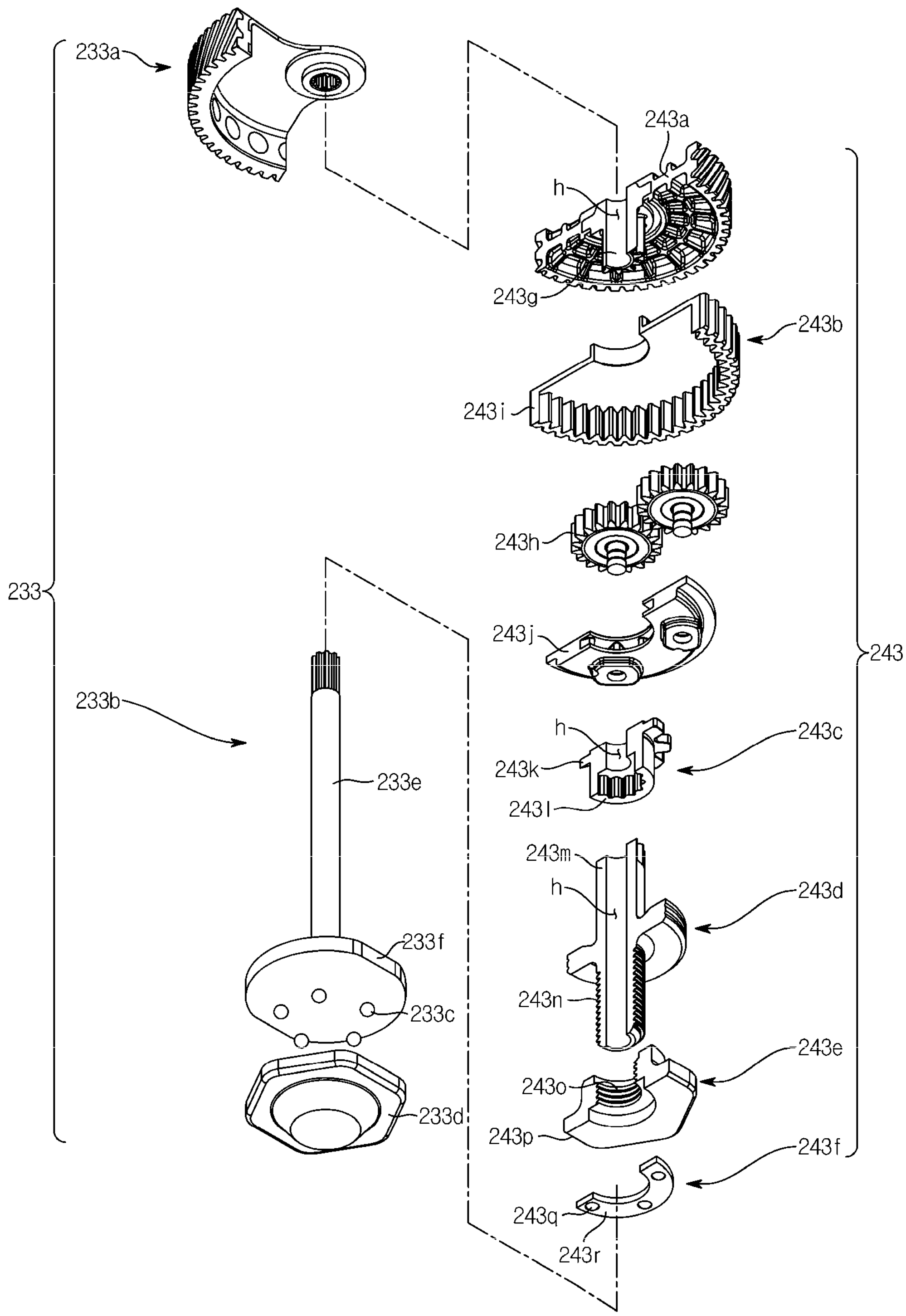

【FIG. 7】
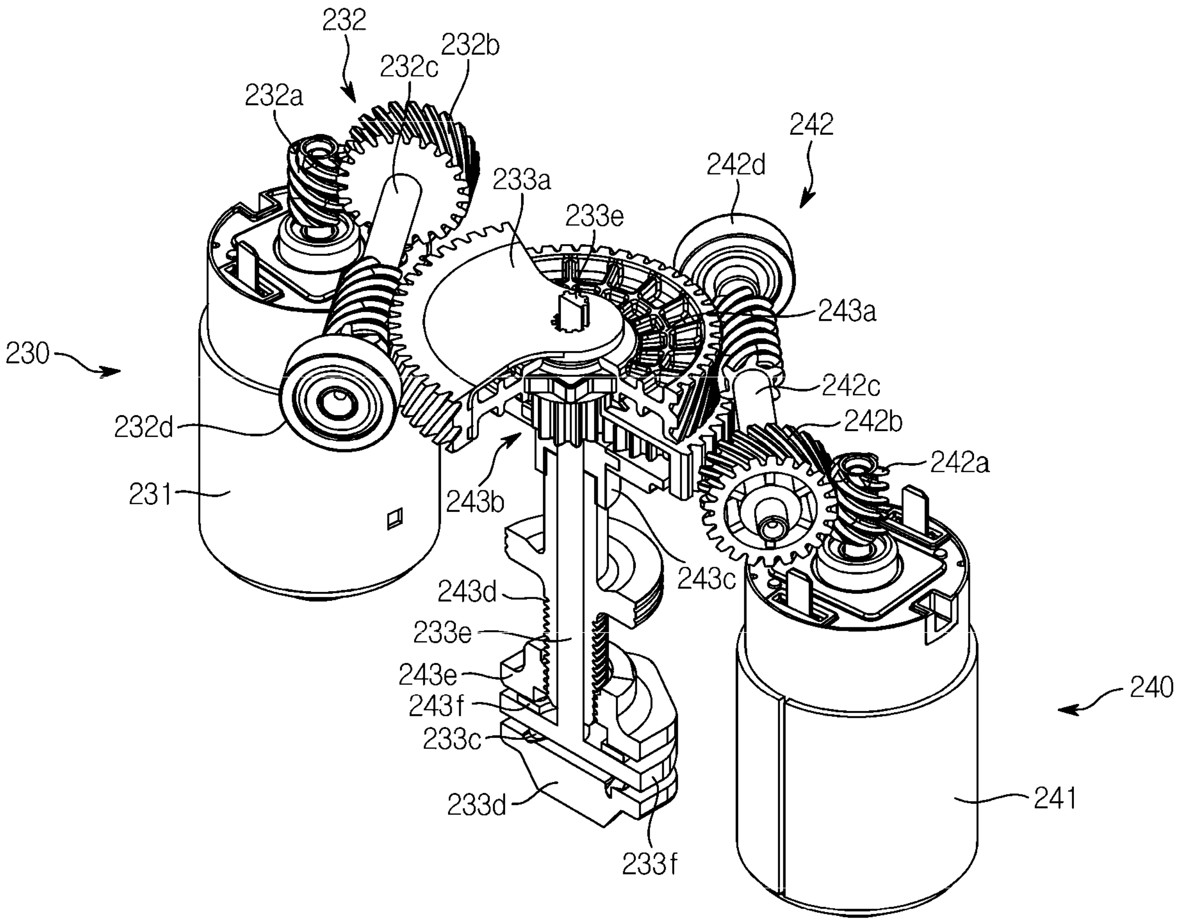

【FIG. 8】
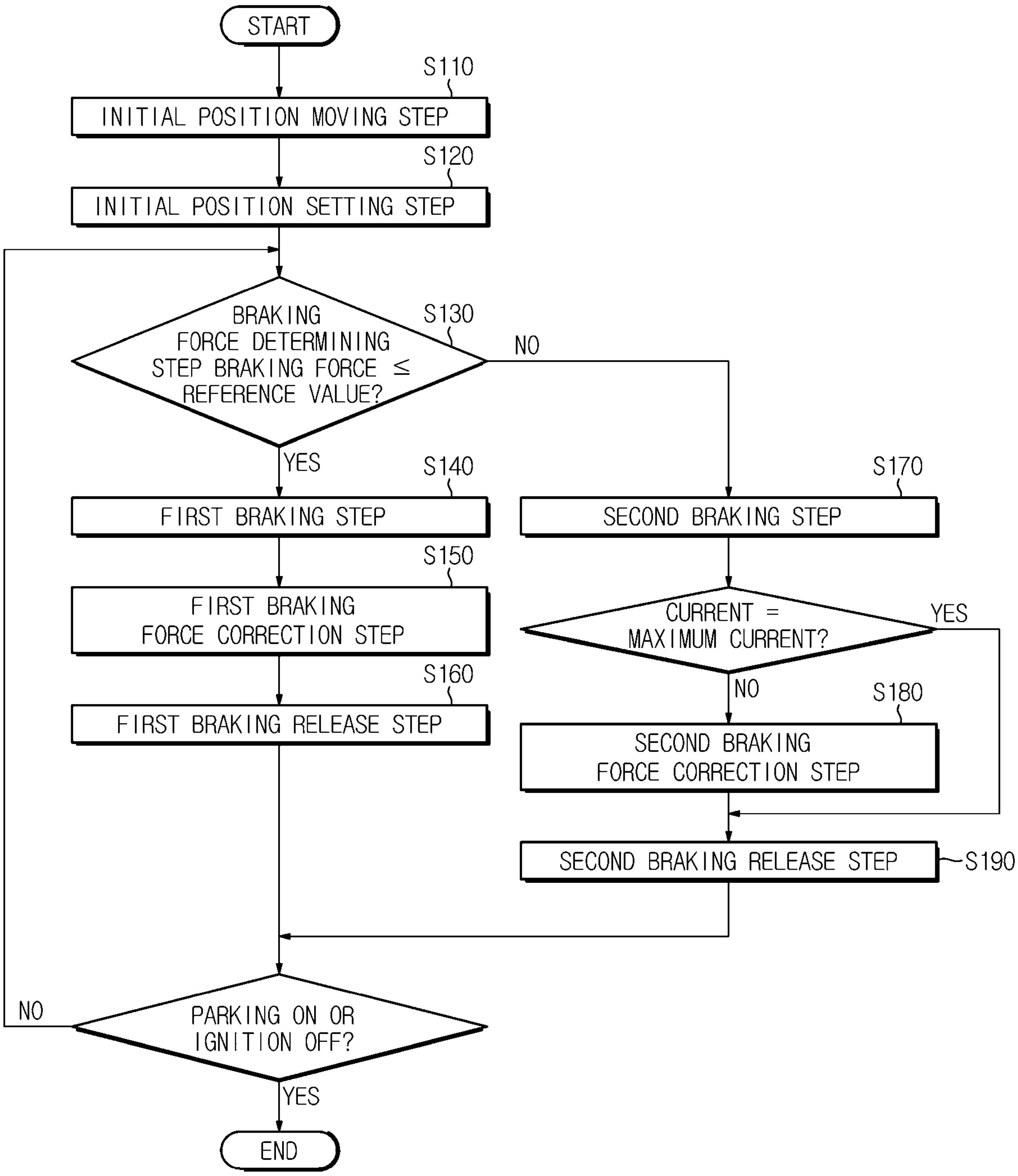

【FIG. 9】
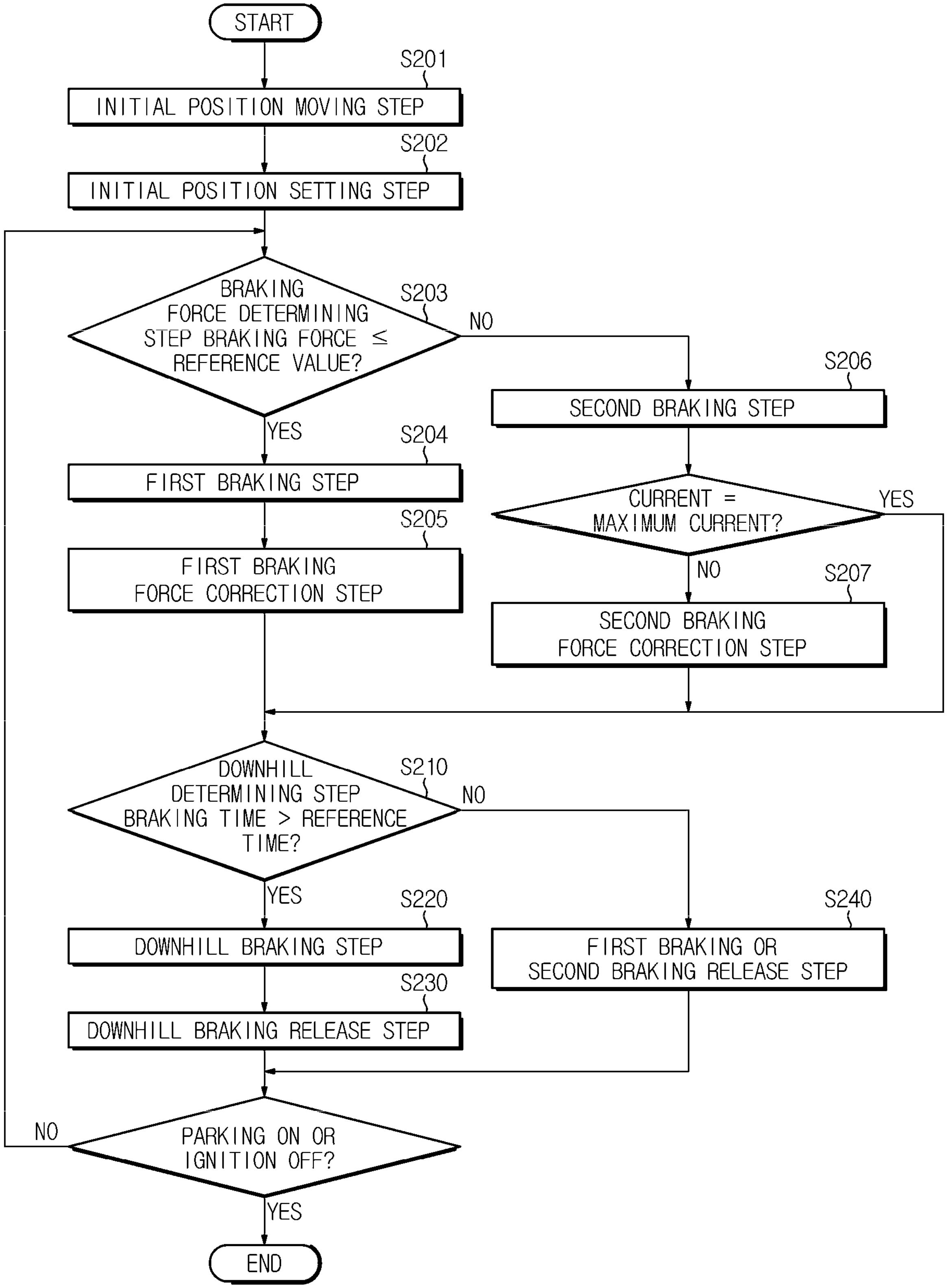

【FIG. 10】
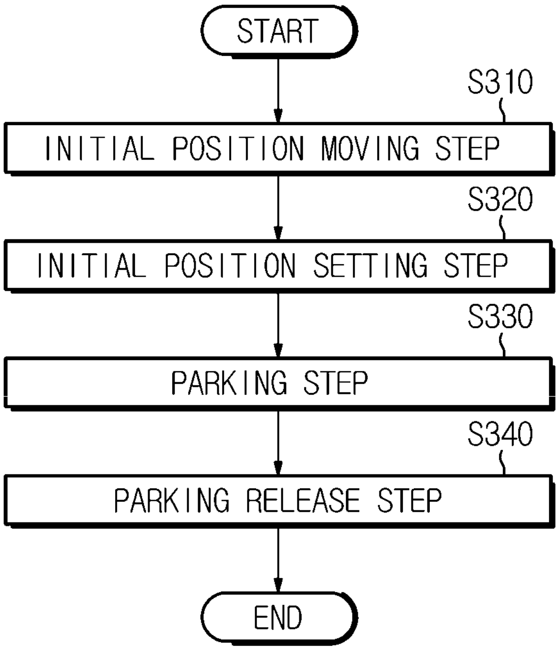

BRAKE ACTUATOR AND ELECTROMECHANICAL BRAKE USING THE SAME AND CONTROL METHOD THEREOF

CROSS-REFERENCE TO RELATED APPLICATION(S)

This application is based on and claims priority under 35 U.S.C. § 119 to Korean Patent Application No. 10-2018-0093838, filed on Aug. 10, 2018, in the Korean Intellectual Property Office, the disclosure of which is incorporated herein by reference in its entirety.

BACKGROUND

1. Field

The present disclosure relates to a brake actuator and an electromechanical brake using the brake actuator and a control method thereof, and more particularly, to a brake actuator for performing a braking operation using a plurality of motors and an electromechanical brake using the brake actuator.

2. Description of the Related Art

Generally, an electromechanical brake, which is known for the next generation brake concept, is an apparatus that controls a braking pressure of front and rear wheels of vehicle using a motor after detecting a driver's braking will.

The electromechanical brake enables all intelligent braking functions from general braking, anti-lock brake system (ABS), electronic stability control (ESC), and vehicle dynamics control (VDC) to an automatic braking function required in future intelligent cruise control systems.

However, a conventional electromechanical brake has a limited ability to perform complex braking functions or generate various braking forces depending on a condition of the vehicle.

To solve this problem, the electromechanical brake using a plurality of actuators has been developed. However, there is a problem to be solved such as an increase in the length of electromechanical brake due to use of a plurality of actuators and a complexity of a power transmission structure.

RELATED ART DOCUMENT

Patent Document

KR 10-1511437 (Apr. 4, 2015)

SUMMARY

It is an aspect of the present disclosure to provide a brake actuator capable of reducing a length of an actuator and simplifying a power transmission structure of the actuator and an electromechanical brake using the brake actuator and a control method thereof.

Additional aspects of the disclosure will be set forth in part in the description which follows and, in part, will be obvious from the description, or may be learned by practice of the disclosure.

In accordance with one aspect of the present disclosure, a brake actuator provided in a disc brake to press or release a piston and controlled by an electrical signal includes a first actuator including a first power transmission unit configured to transmit power to the piston side; and a second actuator including a second power transmission unit configured to transmit power to the piston side; wherein the first and second power transmission units are arranged coaxially.

Further, the first power transmission unit may include a first worm wheel gear, and the second power transmission unit includes a second worm wheel gear disposed inside the first worm wheel gear.

Further, the first power transmission unit may include a shaft passing through the second power transmission unit.

Further, the second power transmission unit may press or release a rotary flange connected to the shaft.

Further, the first actuator may further include a first gear unit transmitting power to the first power transmission unit, and the first gear unit may include a first worm gear, a first helical gear engaged with the first worm gear to be rotated, and a first worm shaft coupled to the center of rotation of the first helical gear to be rotated.

Further, the second actuator may further include a second gear unit transmitting power to the second power transmission unit, and the second gear unit may include a second worm gear, a second helical gear engaged with the second worm gear to be rotated, and a second worm shaft coupled to the center of rotation of the second helical gear to be rotated.

Further, the first power transmission unit may include a first worm wheel gear, a rotation pressing portion coupled with the first worm wheel gear to be rotated, and a pressing ramp portion moved by rotation of the rotation pressing portion to press or release the piston.

Further, the second power transmission unit may be supported by the rotation pressing portion.

Further, the second power transmission unit may press or release the rotation pressing portion.

Further, the second power transmission unit may include a second worm wheel gear, a deceleration portion driven by rotation of the second worm wheel gear, a rotation portion rotated by driving of the deceleration portion, a spindle rotated by being inserted the rotation portion, and a nut spindle moved in the axial direction by rotation of the spindle.

Further, the second power transmission unit may be supported by the first power transmission unit.

Further, the second power transmission unit may include an anti-rotation portion configured to prevent power of the first power transmission unit from being transmitted.

Further, the first power transmission unit may include a pressing ramp portion in contact with the piston to press the piston and a rotation pressing portion pressing or releasing the pressing ramp portion through a ball, and the second power transmission unit may include a spindle passed through the rotation pressing portion and a nut spindle coupled to the spindle for pressing or releasing the rotation pressing portion.

In accordance with another aspect of the present disclosure, an electromechanical brake includes the brake actuator above-described.

In accordance with other aspect of the present disclosure, a control method of an electromechanical brake including a brake actuator provided in a disc brake to press or release a piston and controlled by an electrical signal includes moving a ball pressing the piston through a pressing ramp portion to an initial position of the lowest point as a braking release point; setting rotational positions of first and second power generating units configured to convert electrical energy into mechanical rotational kinetic energy to a braking initial position after the moving the ball; determining braking force by comparing current corresponding to braking force in accordance with a driver's braking will with a reference value to supply the current to at least one of the first and second power generating units; and when the current corresponding to the braking force in accordance with the driver's braking will is less than or equal to the reference value, performing a first braking such that the first power generating unit operated by the current calculated in the determining braking force presses the piston directly through the pressing ramp portion.

Further, the control method may further include correcting a first braking force by comparing a predicted rotation value of the rotational axis of the first power generating unit based on the current supplied through the determining braking force with an actual rotation value sensed through a relative angle sensor of the first power generating unit.

Further, the control method may further include when the current corresponding to the braking force in accordance with the driver's braking will exceeds the reference value, performing a second braking such that the first power generating unit is supplied with the maximum current and the second power generating unit is driven by the current calculated in the determining braking force.

Further, the control method may further include correcting a second braking force by comparing a predicted rotation value of the rotational axis of the second power generating unit based on the current supplied through the determining braking force with an actual rotation value sensed through the relative angle sensor of the second power generating unit.

Further, the control method may further include determining a downhill such that a braking time in accordance with the driver's braking will is compared with a reference time and when the braking time in accordance with the driver's braking will exceeds the reference time, the current supplied to the first power generating unit is removed and the current calculated to correspond to the braking force in accordance with the driver's braking will is supplied to the second power generating unit.

In accordance with the other aspect of the present disclosure, a control method of an electromechanical brake including a brake actuator provided in a disc brake to press or release a piston and controlled by an electrical signal includes moving a ball pressing the piston through a pressing ramp portion to an initial position of the lowest point as a braking release point; setting rotational positions of first and second power generating units configured to convert electrical energy into mechanical rotational kinetic energy to a braking initial position after the moving the ball; and performing parking brake in accordance with the driver's parking will such that the current is supplied only to the second power generating unit in a state where the current supplied to the first power generating unit is removed.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a view showing an electromechanical brake, according to an embodiment of the present disclosure;

FIG. 2 is a cross-sectional view taken along the line A-A' in FIG. 1;

FIG. 3 is a view showing a brake actuator, according to the embodiment of the present disclosure;

FIG. 4 is a view showing a housing of the brake actuator, according to the embodiment of the present disclosure;

FIG. 5 is a view illustrating a state where first and second actuators are coupled with a piston, according to the embodiment of the present disclosure;

FIG. 6 is an exploded view of the first and second actuators, according to the embodiment of the present disclosure.

FIG. 7 is a partially cross-sectional view illustrating a state where the first and second actuators are coupled, according to the embodiment of the present disclosure.

FIGS. 8 to 10 are views showing a method of controlling the electromechanical brake, according to the embodiment of the present disclosure.

DETAILED DESCRIPTION

Hereinafter, embodiments of the present disclosure will be described in detail with reference to the accompanying drawings. The following embodiments are provided to sufficiently transfer the technical concepts of the disclosure to one of ordinary skill in the art. However, the disclosure is not limited to these embodiments, and may be embodied in another form. In the drawings, parts that are irrelevant to the descriptions may be not shown in order to clarify the disclosure, and also, for easy understanding, the widths, lengths, thicknesses, etc. of components are more or less exaggeratedly shown. Like numbers refer to like elements throughout this specification.

Referring to FIGS. 1 to 7, an electromechanical brake according to an embodiment includes a disc brake 100 and a brake actuator 200.

The disc brake 100 presses a disc rotating together with wheels of vehicle to perform a braking operation. The disc brake 100 includes a fixed type disc brake or a floating type disc brake. Hereinafter, for the sake of convenience of explanation, a description will be limited to the floating type disk brake as shown in the drawings.

The disc brake 100 includes a pair of pad plates 110 mounted on a carrier and each having a friction pad P for pressing the disc rotating together with wheels, a caliper housing 120 slidably mounted on the carrier for operating the pair of the pad plates 110, and a piston 130 provided in the caliper housing 120 so as to be movable forward and backward.

The pad plates 110 include an inner pad plate 111 having an inner surface to which a friction pad P is attached and an outer surface contacting a front end of the piston 130, and an outer pad plate 112 having an inner surface to which the friction pad P is attached and an outer surface contacting the caliper housing 120.

The caliper housing 120 is slidably mounted on the carrier through a pair of guide rods and includes a cylinder portion 121 in which the piston 130 is accommodated, a finger portion 122 for operating the outer pad plate 112, and a connection portion 123 for connecting the finger portion 122 and the cylinder portion 121.

The piston 130 is installed in the caliper housing 120 and slidably inserted into the cylinder portion 121 of the caliper housing 120. The piston 130 is formed in a cylindrical shape having a cup shape inside and operated by the brake actuator 200 to press the pad plates 110.

The piston 130 is actuated by a first actuator 230 or a second actuator 240, which are described later or actuated by the first and second actuators 230 and 240.

The piston 130 is provided with a polygonal inner surface corresponding to a polygon 243*p* of a nut spindle 243*e* described later so as to be prevented from rotating when the brake actuator 200 is operated.

The brake actuator 200 is installed on the disc brake 100 to press or release the piston 130, and specifically installed on the caliper housing 120 to press or release the piston 130. The brake actuator 200 is controlled by an electrical signal.

The brake actuator 200 includes an actuator housing 210 coupled to the caliper housing 120, a cover 220 sealing an opening surface of the actuator housing 210, and the first and second actuators 230 and 240 installed in the actuator housing 210 to actuate the piston 130.

The actuator housing 210 is coupled to the caliper housing 120 to support the brake actuator 200 and includes a first accommodating portion 211, a second accommodating portion 212, and an anti-movement portion 213.

The first and second accommodating portions 211 and 212 are formed in circular hollow grooves to accommodate first and second power generating units 231 and 241 described later, respectively, and support first and second gear units 232 and 242, which are described later, through a plurality of steps 214, respectively.

The anti-movement portion 213 is provided between the first accommodating portion 211 and the second accommodating portion 212 to prevent the second actuator 240 from moving. The anti-movement portion 213 prevents the movement of a ring gear **243*i* of the second actuator 240 to be described later and specifically engages with the ring gear 243*i* to prevent the ring gear 243*i*** from moving.

The anti-movement portion 213 is formed with a through-hole **213*a* so that first and second power transmission units 233 and 243 described later may pass through the actuator housing 210. The through-hole 213*a* is formed at a center of the bottom surface of the anti-movement portion 213 and is formed at a center of the first accommodating portion 211 and the second accommodating portion 212**.

The first and second accommodating portions 211 and 212 are disposed to face each other with respect to the anti-movement portion 213, also disposed to face each other with respect to a rotational axis A1 of the first and second power transmission units 233 and 243 described later. The rotational axis A1 of the first and second power transmission units 233 and 243 refers to a central axis of rotation in which the first and second power transmission units 233 and 243 rotate, it is also applied to a rotational axis A2 of the first power generating unit 231 and a rotational axis A3 of the second power generating unit 241, which are described later.

The first and second accommodating portions 211 and 212 are provided on left and right sides of the cylinder portion 121 of the caliper housing 120 so that the brake actuator 200 is compactly installed. The first accommodating portion 211, the piston 130, and the second accommodating portion 212 are arranged in a line.

The cover 220 is installed on the opening surface of the actuator housing 210 to seal the opening surface of the actuator housing 210. The cover 220 is provided in a box shape having an open bottom so as to be coupled with the actuator housing 210. For example, the cover 220 is coupled with the actuator housing 210 by ultrasonic waves welding or laser welding to easily seal the actuator housing 210.

The first actuator 230 is installed in the actuator housing 210 to actuate the piston 130 and perform the braking operation.

The first actuator 230 includes the first power generating unit 231, the first gear unit 232, and the first power transmission unit 233.

The first power generating unit 231 is accommodated in the circular hollow groove provided in the first accommodating portion 211, and receives electric power in accordance with a driver's braking will by operation of a pedal or a switch provided in a driver's seat of the vehicle to convert electrical energy into mechanical rotational kinetic energy.

A control of the braking operation according to an operation signal of the pedal or the switch is performed by the electronic control unit (ECU) of the vehicle.

The first power generating unit 231 includes a power generating device such as a motor, and more specifically, a DC motor.

The first power generating unit 231 is provided with a position sensor to sense a rotational position of the motor. The position sensor may use a relative angle sensor which is less expensive compared to an absolute angle sensor.

The rotational axis A2 of the first power generating unit 231 is parallel to the rotational axis A1 of the first power transmission unit 233, and more specifically is parallel to the rotational axis A1 of the first power transmission unit 233 and the second power transmission unit 243 which will be described later.

The first power generating unit 231 presses or releases the piston 130 by forward rotation or reverse rotation.

The first gear unit 232 is accommodated in the first accommodating portion 211 to be supported by the plurality of steps 214 and transmits the power generated from the first power generating unit 231 to the first power transmission unit 233.

The first gear unit 232 includes a first worm gear **232*a*, a first helical gear 232*b*, a first worm shaft 232*c*, and a first ball bearing 232*d***.

The first worm gear **232*a* is coupled to the first power generating unit 231 to be rotated around an axis of the first power generating unit 231**.

The first helical gear **232*b* is engaged with the first worm gear 232*a* and is rotated so that a rotational direction thereof is switched in a direction perpendicular to the axis of the first power generating unit 231**.

The first worm shaft **232*c* is coupled to a center of rotation of the first helical gear 232*b* to be rotated and transmits the rotational force of the first power generating unit 231 to the first power transmission unit 233. The first worm shaft 232*c* is provided such that on one side of the shaft is provided with a worm gear, and the other side of the shaft, which is spaced apart from the worm gear, is coupled to the first helical gear 232*b*. The other side of the shaft coupled with the first helical gear 232*b* is provided to protrude from the first helical gear 232*b* and is supported by the step 214** or a separate bracket.

The first ball bearing **232*d* is coupled to the first worm shaft 232*c* and is supported by the step 214 formed in the first accommodating portion 211. The first ball bearing 232*d* is installed at one of ends of the first worm shaft 232*c*, which is adjacent to the worm gear of the first worm shaft 232*c*, to be coupled with the first worm shaft 232*c* and reduces vibrations or shocks generated during the rotation of the first worm gear 232*a*, the first helical gear 232*b*, and the first worm shaft 232*c***, which are engaged with each other.

The first power transmission unit 233 transmits the power transmitted from the first gear unit 232 to the piston 130 side, and includes a first worm wheel gear **233*a*, a rotation pressing portion 233*b*, balls 233*c*, and a pressing ramp portion 233*d***.

The first worm wheel gear **233*a* is engaged with the first worm shaft 232*c* to be rotated. The first worm wheel gear 233*a* is formed to surround the second worm wheel gear 243*a* described later and is provided to rotate along an outer peripheral surface of the second worm wheel gear 243*a*. The first worm wheel gear 233***a* switches the rotational direction of the first gear unit 232 back to a vertical direction, for example, a direction parallel to the first power generating unit 231. The first worm wheel gear 233*a* is formed of a sector gear of a sector shape, and includes a bottom surface of sector shape and a side surface on which a gear is formed.

When the first worm wheel gear 233*a* is formed in a sector shape, overall weight of the brake actuator 200 can be reduced and the first worm wheel gear 233*a* and the second gear unit 242 described later may be prevented from interfering with each other.

The first worm wheel gear 233*a* is made of a polymer synthetic resin such as plastic so as to be rotated in a reverse rotation direction, that is, in the braking release direction, when no power is supplied to the first power generating unit 231.

The rotation pressing portion 233*b* is connected to the first worm wheel gear 233*a* to be rotated, and presses the pressing ramp portion 233*d* via the balls 233*c*.

The rotation pressing portion 233*b* includes a shaft 233*e* and a rotary flange 233*f*.

The shaft 233*e* passes through the second power transmission unit 243 to be described later, and a spline is formed on an outer periphery of the shaft 233*e* to be connected to the first worm wheel gear 233*a*. When the shaft 233*e* and the first worm wheel gear 233*a* are connected to each other via the spline, the rotary pressing portion 233*b* is moved in a longitudinal direction of the shaft 233*e* by the second power transmission unit 243, thereby pressing the pressing ramp portion 233*d*.

One end of the shaft 233*e* is firmly supported by the cover 220.

The rotary flange 233*f* is provided at the other end of the shaft 233*e* to be rotated together with the shaft 233*e*. The rotary flange 233*f* is connected to the pressing ramp portion 233*d* via the balls 233*c* and rotated together with the shaft 233*e* to move the pressing ramp portion 233*d* through the balls 233*c*.

A separate preventing groove is formed on a bottom surface of the rotary flange 233*f* to prevent the balls 233*c* from being separated. The separate preventing grooves are formed on both bottom surfaces of the rotary flange 233*f* to prevent balls 243*q* of an anti-rotation portion 243*f* from being separated. A depth of the separate preventing groove is smaller than the diameter of the balls 233*c* so that a part of the ball 233*c* is accommodated.

The pressing ramp portion 233*d* is moved by the rotation of the rotation pressing portion 233*b* to be in contact with the piston 130 and then presses the piston 130 directly. The pressing ramp portion 233*d* includes a guide groove which is inclined to move forward for the braking or move backward for release of the braking in accordance with the rotational movement of the balls 233*c*. The outer surface of the pressing ramp portion 233*d* is formed in the polygonal shape corresponding to the inner surface of the piston 130.

The second actuator 240 is installed in the actuator housing 210 to actuate the piston 130 and perform the braking operation.

The second actuator 240 includes the second power generating unit 241, a second gear unit 242, and the second power transmission unit 243.

The second power generating unit 241 is accommodated in the circular hollow groove provided in the second accommodating portion 212 and receives electric power in accordance with a driver's braking will by operation of the pedal or the switch provided in the driver's seat of the vehicle to convert electrical energy into mechanical rotational kinetic energy.

The control of the braking operation according to the operation signal of the pedal or the switch is performed by the ECU of the vehicle.

The second power generating unit 241 includes the power generating device such as motor, and more specifically, DC motor.

The second power generating unit 241 is provided with a position sensor to sense the rotational position of the motor. The position sensor may use a relative angle sensor which is less expensive compared to an absolute angle sensor.

The second power generating unit 241 presses or releases the piston 130 by forward rotation or reverse rotation.

The rotational axis A3 of the second power generating unit 241 is parallel to the rotational axis A1 of the second power transmission unit 243, and more specifically is parallel to the rotational axis A1 of the first and second power transmission units 233 and 243.

The second gear unit 242 is accommodated in the second accommodating portion 212 to be supported by the plurality of steps 214, and transmits the power generated from the second power generating unit 241 to the second power transmission unit 243. The second gear unit 242 includes a second worm gear 242*a*, a second helical gear 242*b*, a second worm shaft 242*c*, and a second ball bearing 242*d*.

The second worm gear 242*a* is coupled to the second power generating unit 241 to be rotated around an axis of the second power generating unit 241.

The second helical gear 242*b* is engaged with the second worm gear 242*a* and is rotated so that a rotational direction thereof is switched in a direction perpendicular to the axis of the second power generating unit 241.

The second worm shaft 242*c* is coupled to a center of the rotation of the second helical gear 242*b* to be rotated and transmits the rotational force of the second power generating unit 241 to the second power transmission unit 243. The second worm shaft 242*c* is provided such that on one side of the shaft is provided with a worm gear, and the other side of the shaft, which is spaced apart from the worm gear, is coupled to the second helical gear 242*b*. The other side of the shaft coupled with the second helical gear 242*b* is provided to protrude from the second helical gear 242*b* and is supported by the step 214 or a separate bracket.

The second ball bearing 242*d* is coupled to the second worm shaft 242*c* and is supported by the step 214 formed in the second accommodating portion 212. The second ball bearing 242*d* is installed at one of ends of the second worm shaft 242*c*, which is adjacent to the worm gear of the worm shaft 242*c*, to be coupled with the second worm shaft 242*c* and reduces vibrations or shocks generated during the rotation of the second worm gear 242*a*, the second helical gear 242*b*, and the second worm shaft 242*c*, which are engaged with each other.

The second power transmission unit 243 transmits the power transmitted from the second gear unit 242 to the piston 130 side through the rotary flange 233*f*, and specifically presses the rotary flange 233*f* by the power transmitted from the second gear unit 242 to support or advance the rotary pressing portion 233*b* and the pressing ramp portion 233*d*, thereby pressing the piston 130.

The second power transmission unit 243 may be provided with the same rotational axis A1 as the first power transmission unit 233.

The second power transmission unit 243 includes a second worm wheel gear 243*a*, a deceleration portion 243*b*, a rotation portion 243*c*, a spindle 243*d*, a nut spindle 243*e*, and the rotation preventing portion 243*f*.

A shaft receiving hole h for receiving the shaft 233*e* is formed at the center of the second worm wheel gear 243*a*, the deceleration portion 243*b*, the rotation portion 243*c*, and the spindle 243*d* so that a center of rotation of the first power transmission unit 233 and the second power transmission unit 243 are the same.

The second worm wheel gear 243*a* is engaged with the second worm shaft 242*c* to be rotated and is disposed inside the first worm wheel gear 233*a*. The second worm wheel gear 243*a* switches the rotational direction of the second gear unit 242 back to a vertical direction, for example, a direction parallel to the second power generating unit 241. The shaft receiving hole h through which the shaft 233*e* passes is formed at the center of the second worm wheel gear 243*a*. The second worm wheel gear 243*a* is axially supported by a shaft 233*e* accommodated therein.

The deceleration portion 243*b* is driven by rotation of the second worm wheel gear 243*a* and controls reduction ratio of the second actuator 240. The deceleration portion 243*b* includes a sun gear 243*g*, planetary gears 243*h*, the ring gear 243*i*, and a carrier 243*j*.

The sun gear 243*g* is rotated together with the second worm wheel gear 243*a* and provided to protrude axially in a lower side of the second worm wheel gear 243*a*. A shaft receiving hole h through which the shaft 233*e* passes is formed at the center of the sun gear 243*g*.

The planetary gears 243*h* are engaged with an outside of the sun gear 243*g* to be rotated. A plurality of planetary gears 243*h* may be provided in consideration of efficiency and economy and more specifically, four planetary gears 243*h* are disposed in a shape surrounding the sun gear 243*g*. The planetary gears 243*h* are provided rotatably in that a shaft thereof is inserted into the carrier 243*j*.

The ring gear 243*i* is fixed to the anti-movement portion 213, and includes a bottom surface and a side surface so that the sun gear 243*g* and the planetary gears 243*h* are accommodated therein. A hole is formed in the bottom surface of the ring gear 243*i* so as to allow the sun gear 243*g* to be inserted thereto and an internal gear to accommodate the planetary gears 243*h* is provided on an inner side surface of the ring gear 243*i*. A gear is formed on an outer surface of the ring gear 243*i* so as to mesh with the anti-movement portion 213.

The carrier 243*j* rotatably supports the planetary gears 243*h* and is installed to rotate coaxially with the sun gear 243*g* to output rotational power. At the center of the carrier 243*j*, a hole having an internal gear formed along the inner surface of the hole is provide to output the rotational power of the carrier 243*j* to the rotation portion 243*c*.

The rotation portion 243*c* is rotated by driving the deceleration portion 243*b*. The rotation portion 243*c* is engaged with the internal gear provided in the hole of the carrier 243*j* to be rotated, and transmits the rotational force to the spindle 243*d*. The rotation portion 243*c* includes a rotary gear portion 243*k* which is rotated by being engaged with the internal gear provided in the hole of the carrier 243*j* and an insertion portion 243*l* in which an internal gear is formed so that the spindle 243*d* is rotatably inserted. A shaft receiving hole h through which the shaft 233*e* passes is formed at the center of the rotation portion 243*c*.

The spindle 243*d* is rotated by the rotation of the rotation portion 243*c* and includes an insertion gear part 243*m*, which is inserted into the insertion portion 243*l* of the rotation portion 243*c* and engaged with the internal gear formed in the insertion portion 243*l* to be rotated, and a male screw part 243*n* extending from the insertion gear part 243*m* by a predetermined length toward an inner center portion of the piston 130.

The nut spindle 243*e* moves forward and backward in the axial direction by rotation of the spindle 243*d* and presses or releases the anti-rotation portion 243*f* The inner surface of the nut spindle 243*e* is provided with a female screw part 243*o* coupled to the male screw part 243*n* of the spindle 243*d* and the outer surface of the nut spindle 243*e* is provided with a polygon 243*p* corresponding to the inner surface of the piston 130.

A separate preventing groove for preventing the balls 243*q* of the anti-rotation portion 243*f* from being separated is formed on end portion of the nut spindle 243*e*. A depth of the separate preventing groove is smaller than the diameter of the balls 243*q* so that a par of the ball 243*q* is accommodated.

The anti-rotation portion 243*f* prevents the power of the first power transmission unit 233 from being transmitted to the second power transmission unit 243. The anti-rotation portion 243*f* is moved by forward and backward movement of the nut spindle 243*e* to press the rotary pressing portion 233*b* and prevent the rotational force of the rotary pressing portion 233*b* from being transmitted to the nut spindle 243*e*. The anti-rotation portion 243*f* includes the balls 243*q* rotated by the rotation of the rotation pressing portion 233*b* and an anti-moving plate 243*r* restricting the balls 243*q* to prevent the balls 243*q* from being moved.

Hereinafter, a method of controlling the electromechanical brake will be described with reference to FIGS. 8 to 10. For convenience of explanation, a normal braking mode, a downhill braking mode, and a parking mode will be described separately.

The normal braking mode, the downhill braking mode, and the parking mode are controlled by the ECU of the vehicle in accordance with the driver's braking will.

Referring to FIG. 8, the normal braking mode of the electromechanical brake control method according to an embodiment of the present disclosure includes an initial position moving step (S110), an initial position setting step (S120), a braking force determining step (S130), a first braking step (S140), a first braking force correction step (S150), a first braking release step (S160), a second braking step (S170), a second braking force correction step (S180), and a second braking release step (S190).

The initial position moving step (S110) is a step of moving the position of the balls 233*c* to an initial position of the lowest point as a braking release point so that the normal braking mode is performed. Specifically, the first power generating unit 231 is rotated in the braking release direction to operate the first gear unit 232 in the braking release direction, and the balls 233*c* of the first power transmission unit 233 are moved in the braking release direction by the operation of the first gear unit 232 so that the balls 233*c* are moved to a position as far as possible from the guide groove formed in the pressing ramp portion 233*d*.

In addition, the second power generating unit 241 is rotated in the braking release direction to move the nut spindle 243*e* and the anti-rotation portion 243*f* to a position as far as possible from the piston 130.

When the initial position moving step (S110) is applied, the piston 130 may be spaced apart from the inner pad plate 111, so that a clearance between the friction pad P and the disk is secured to prevent the friction pad P from being worn during travel.

In addition, reducing the operating error of the electromechanical brake due to a difference in product performance or a structural change due to long-term use may be enabled.

The initial position setting step (S120) is a step of setting the rotational position of the first and second power generating units 231 and 241 to a braking initial position after the initial position moving step (S110). Specifically, the position of the rotational axes A2 and A3 of the first and second power generating units 231 and 241 rotated in the braking release direction through the initial position moving step (S110) are set to a reference position of the relative angel sensors provided in the first and second power generating units 231 and 241.

When the reference position of the relative angle sensors is set through the initial position setting step (S120), the braking force in accordance with the driver's braking will, that is, a clamping force may be compensated, details of thereof will be described in detail in the first braking force correction step (S150) to be described later.

The initial position moving step (S110) and the initial position setting step (S120) may be replaced with an initial position moving step (S310) and an initial position setting step (S320) of the parking mode, which will be described later, when the parking mode is changed to the normal braking mode after the parking mode is performed.

The braking force determining step (S130) includes selecting the first braking step (S140) or the second braking step (S170) by calculating current corresponding to the braking force in accordance with the driver's braking will when the braking is performed after the initial position setting step (S120). And, the braking force determining step (S130) includes comparing current corresponding to the braking force in accordance with the driver's braking will with a reference value (for example, current) set at the time of designing the electromechanical brake to supply the current to at least one of the first and second power generating units 231 and 241.

The reference value may be 5 A or 15 A.

The first braking step (S140) is performed when the current corresponding to the braking force in accordance with the driver's braking will is less than or equal to the reference value set at the time of designing the electromechanical brake. And, in the first braking step (S140), the first power generating unit 231 is operated by the current calculated in the braking force determining step (S130), the first gear unit 232 is operated by driving the first power generating unit 231, and the first power transmission unit 233 is operated by the operation of the first gear unit 232 to press piston 130, thereby performing the braking.

More specifically, the first braking step (S140) is performed during the normal braking, not in an emergency such as a rapid braking. In the first braking step 140, the driving force of the first power generating unit 231 is transmitted directly to the first worm gear 232*a*, the first helical gear 232*b*, the first worm shaft 232*c*, the first worm wheel gear 233*a*, and the rotation pressing portion 233*b*, for the rapid braking without going through decelerator such as planetary gears. And, the balls 233*c* rotationally moved by the driving force transmitted to the rotation pressing portion 233*b* press quickly the pressing ramp portion 233*d* so as to press the piston 130, thereby performing the braking.

The first braking force correction step (S150) is a step of correcting the braking force by comparing a predicted rotation value of the rotational axis A2 of the first power generating unit 231 based on the current supplied through the braking force determination step (S130) with an actual rotation value sensed through the relative angle sensor of the first power generating unit 231. When the difference between the predicted rotation value and the actual rotation value occurs, the braking force is corrected by increasing or decreasing the current supplied to the first power generating unit 231 after calculating the current to the difference value.

The first braking release step (S160) is a step of releasing the braking by removing the current supplied to the first power generating unit 231 when no the driver's braking will generates. In the first braking release step (S160), the friction pad P, the pad plates 110, the piston 130, and the pressing ramp portion 233*d* are sequentially moved in the braking release direction by the rotational force of the disk, the balls 233*c* and the rotation pressing portion 233*b* are rotated by the movement of the pressing ramp portion 233*d*, and the first worm wheel gear 233*a* is rotated so that the first worm shaft 232*c*, the first helical gear 232*b*, and the first worm gear 232*a* are rotated in the braking release direction, thereby releasing the braking.

Because the first power generating unit 231 is connected to the piston 130 through the first worm wheel gear 233*a* made of polymer synthetic resin such as plastic, when the current supplied to the first power generating unit 231 is removed, a reverse rotation in the braking release direction is generated.

When additional braking occurs, the position of the rotational axis A2 of the first power generating unit 231 is checked through the relative angle sensor provided in the first power generating unit 231 and then the current is supplied to at least one of the first and second power generating units 231 and 241 through the braking force determining step (S130) by reflecting the checked position of the rotational axis A2 of the first power generating unit 231.

In the first braking release step (S160), when no the driver's braking will generates, the first power generating unit 231 is reversely rotated in the braking release direction to release the braking and then the position of the balls 233*c* is changed to a position as far as possible from the guide groove formed in the pressing ramp portion 233*d*, that is, the initial position.

The second braking step (S170) is performed when the current corresponding to the braking force in accordance with the driver's braking will exceeds the reference value set at the time of designing the electromechanical brake. In the second braking step (S170), the first and second power generating units 231 and 241 are driven by the current calculated in the braking force determining step (S130), thereby performing the braking.

In the second braking step (S170), maximum current is supplied to the first power generating unit 231 to quickly remove the gap between the friction pad P and the disk, and the second actuator 240 is actuated, thereby performing the braking.

More specifically, in the second braking step (S170), the maximum current is supplied to the first power generating unit 231 to press the piston 130, and the driving force of the second power generating unit 241 is transmitted to the second worm gear 242*a*, the second helical gear 242*b*, the second worm shaft 242*c*, the second worm wheel gear 243*a*, and the deceleration portion 243*b*. The rotation portion 243*c* and the spindle 243*d* are rotated by the decelerated driving force transmitted to deceleration portion 243*b*, and the nut spindle 243*e* and the anti-rotation portion 243*f* are moved by the rotation of the spindle 243*d* to press the rotary flange 233*f*, thereby performing the braking.

The second braking force correcting step (S180) is a step of correcting the braking force by comparing a predicted rotation value of the rotational axis A3 of the second power generating unit 241 based on the current supplied through the braking force determination step (S130) with an actual rotation value sensed through the relative angle sensor of the second power generating unit 241. When the difference between the predicted rotation value and the actual rotation value occurs, the braking force is corrected by increasing or decreasing the current supplied to the second power generating unit 231 after calculating the current to the difference value.

The second braking force correcting step (S180) may be omitted when the current value determined in the braking force determining step (S130) is the maximum current of the second power generating unit 241.

In the second braking release step (S190), when no the driver's braking will generates, the braking is released by reversely rotating the second power generating unit 241 in the braking release direction together with the first braking release step (S160).

The normal braking mode may be completed when the parking brake is applied or when the ignition is turned off.

Referring to FIG. 9, the downhill braking mode of the electromechanical brake control method according to an embodiment of the present disclosure includes an initial position moving step (S201), an initial position setting step (S202), a braking force determining step (S203), a first braking step (S204), a first braking force correction step (S205), a second braking step (S206), a second braking force correction step (S207), a downhill determining step (S210), a downhill braking step (S220), a downhill braking release step (S230), and a first braking or second braking release step (S240).

The initial position moving step (S201), the initial position setting step (S202), the braking force determining step (S203), the first braking step (S204), the first braking force correcting step (S205), the second braking step (S206), and the initial position setting step (S202) of the downhill braking mode are performed in the same manner as the initial position moving step (S110), the initial position setting step (S120), the braking force determining step (S130), the first braking step (S140), the braking force correction step (S150), the second braking step (S170), and the second braking force correction step (S180) of the above-described normal braking mode. Accordingly, the description thereof will be omitted.

The downhill determining step (S210) is a step of determining braking time in accordance with the driver's braking will to determine the current supplied to the first and second power generating units 231 and 241. Specifically, the downhill determining step (S210) includes determining a downhill by comparing the braking time in accordance with the driver's braking will with a reference time set at the time of designing the electromechanical brake and when the braking time in accordance with the driver's braking will exceeds the reference time, removing the current supplied to the first power generating unit 231 for preventing overload of the first power generating unit 231, which is a DC motor, and supplying the current to the second power generating unit 241 by calculating the current corresponding to the braking force in accordance with the driver's braking will.

The reference time may be 3 seconds or 5 seconds.

When the braking time in accordance with the driver's braking will is less than or equal to the reference time, the downhill determining step (S210) includes selecting the normal braking to release the braking through the first braking or second braking release step (S240).

In the downhill braking step (S220), the second power generating unit 241 is driven by the current calculated in the downhill determining step (S210), thereby performing the braking.

More specifically, in the downhill braking step (S220), the nut spindle 243*e* and the anti-rotation portion 243*f* are moved by the driving force of the second power generating unit 241, in a state where the current of the first power generating unit 231 is removed, to press the rotary flange 233*f* such that the braking is performed and the current supplied to the second power generating unit 241 is removed after the braking to prevent the second power generating unit 241, which is a DC motor, from being overloaded.

Because the second power generating unit 241 is connected to the piston 130 through the second worm wheel gear 243*a* and the deceleration portion 243*b*, which are made of a metal, the reverse rotation in the brake releasing direction is not generated even if the current supplied to the second power generating unit 241 is removed.

Thereafter, when the braking force in accordance with the driver's braking will changes, the braking force is adjusted again through the braking force determining step (S203) and when no the driver's braking will generates, the braking is released through the downhill braking release step (S230).

In the downhill braking release step (S230), the second power generating unit 241 is reversely rotated in the braking release direction to release the braking.

The downhill braking mode may be completed when the parking brake is applied or when the ignition is turned off.

Referring to FIG. 10, the parking mode of the electromechanical brake control method according to an embodiment of the present disclosure includes an initial position moving step (S310), an initial position setting step (S320), a parking step (S330), and a parking release step (S340).

The initial position moving step (S310) and the initial position setting step (S320) of the parking mode are the same as the initial position moving step (S110) and the initial position setting step (S120) of the above-described normal braking mode. Accordingly, the description thereof will be omitted.

The parking step (S330) is performed when the driver's parking will is checked through the parking switch or the parking lever provided in the vehicle. Specifically, in the parking step (S330), the current is supplied only to the second power generating unit 241 in a state where the current supplied to the first power generating unit 231 is removed, and the nut spindle 243*e* and the anti-rotation portion 243*f* press the rotary flange 233*f*, thereby performing the parking brake.

Thereafter, the current supplied to the second power generating unit 241 is removed to maintain the parking state.

The parking release step (S340) is performed when the driver's will for releasing the parking brake is checked. In the parking release step (S340), the second power generating unit 241 is reversely rotated in the braking release direction to release the parking brake.

When releasing the parking brake, the electromechanical brake is controlled by the above-described normal braking mode or the downhill braking mode.

As is apparent from the above, the brake actuator according to the present disclosure can generate a complicated braking function and various braking forces because a plurality of actuators including different power transmission units is applied and the brake actuator can simplify a power transmission structure because different power transmission units have the same rotational axis.

The brake actuator according to the present disclosure can reduce a length of the brake actuator because a rotational axis of a first power generating unit and a rotational axis of a second power generating unit are parallel to a rotational axis of a first power transmission unit and a second power transmission unit.

The brake actuator according to the present disclosure can reduce an overall volume of the brake actuator because a second worm wheel gear is disposed inside a first worm wheel gear.

The electromechanical brake according to the present disclosure can be operated at low noise because the first and second actuators include a gear unit in the form of the helical gear and the worm gear, and does not need to provide the gear unit in multiple stages because reduction ratio of the worm gear is large, so that the size can be compacted.

The second actuator of the electromechanical brake according to the present disclosure may include a second worm gear, a second helical gear, a second worm shaft, a second worm wheel gear, and a deceleration portion so that a second power generating unit as a driving source can be downsized and a spindle of the second actuator is decelerated and rotated at high torque. And, a rotation of the spindle is restricted by the large reduction ratio of the deceleration portion when the operation of the second power generating unit is stopped, thereby keeping the braking state.

The electromechanical brake according to the present disclosure can reduce the overall length of the electromechanical brake shorter than the conventional one by arranging the first and second power generating units in the lateral direction of first and second power transmission units, respectively so that a center axis of the first and second power generating units is parallel to an output axis of the first and second power transmission units.

The electromechanical brake according to the present disclosure can effectively reduce arrangement space of the first and second power transmission units because the output axes of the first power transmission unit and the second power transmission unit are coincident with each other. In addition, the total length and volume of the electromechanical brake can be reduced as compared with the conventional one.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A brake actuator provided in a disc brake to press or release a piston and controlled by an electrical signal, the brake actuator comprising:

a first actuator including a first power transmission unit configured to transmit power to a piston side; and a second actuator including a second power transmission unit configured to transmit power to the piston side;

wherein the first and second power transmission units are arranged coaxially, and wherein the first power transmission unit includes a shaft passing through the second power transmission unit.

2. The brake actuator according to claim 1, wherein the first power transmission unit includes a first worm wheel gear, a rotation pressing portion coupled with the first worm wheel gear to be rotated, and a pressing ramp portion moved by rotation of the rotation pressing portion to press or release the piston.

3. The brake actuator according to claim 2, wherein the second power transmission unit is supported by the rotation pressing portion.

4. The brake actuator according to claim 2, wherein the second power transmission unit presses or releases the rotation pressing portion.

5. The brake actuator according to claim 1, wherein the second power transmission unit includes a second worm wheel gear, a deceleration portion driven by rotation of the second worm wheel gear, a rotation portion rotated by driving of the deceleration portion, a spindle rotated in a state of being inserted into the rotation portion, and a nut spindle moved in the axial direction by rotation of the spindle.

6. The brake actuator according to claim 5, wherein the second power transmission unit is supported by the first power transmission unit.

7. The brake actuator according to claim 1, wherein the first power transmission unit includes a first worm wheel gear, and the second power transmission unit includes a second worm wheel gear disposed inside the first worm wheel gear.

8. The brake actuator according to claim 1, wherein the second power transmission unit presses or releases a rotary flange connected to the shaft.

9. The brake actuator according to claim 1, wherein the first actuator further includes a first gear unit transmitting power to the first power transmission unit, wherein the first gear unit includes a first worm gear, a first helical gear engaged with the first worm gear to be rotated, and a first worm shaft coupled to the center of rotation of the first helical gear to be rotated.

10. The brake actuator according to claim 1, wherein the second actuator further includes a second gear unit transmitting power to the second power transmission unit, and the second gear unit includes a second worm gear, a second helical gear engaged with the second worm gear to be rotated, and a second worm shaft coupled to the center of rotation of the second helical gear to be rotated.

11. The brake actuator according to claim 1, wherein the second power transmission unit includes an anti-rotation portion configured to prevent power of the first power transmission unit from being transmitted.

12. The brake actuator according to claim 1, wherein the first power transmission unit includes a pressing ramp portion in contact with the piston to press the piston and a rotation pressing portion pressing or releasing the pressing ramp portion through a ball, and the second power transmission unit includes a spindle passed through the rotation pressing portion and a nut spindle coupled to the spindle for pressing or releasing the rotation pressing portion.

13. An electromechanical brake comprising the brake actuator according to any one of claims 1 to 12.

14. A control method of an electromechanical brake including a brake actuator provided in a disc brake to press or release a piston and controlled by an electrical signal, the control method comprising:

moving a ball pressing the piston through a pressing ramp portion to an initial position of a lowest point as a braking release point;

setting rotational positions of first and second power generating units configured to convert electrical energy into mechanical rotational kinetic energy to a braking initial position after the moving the ball;

determining braking force by comparing current corresponding to braking force in accordance with a driver's braking will with a reference value to supply the current to at least one of the first and second power generating units; and when the current corresponding to the braking force in accordance with the driver's braking will is less than or equal to the reference value, performing a first braking such that the first power generating unit operated by the current calculated in the determining braking force presses the piston directly through the pressing ramp portion.

15. The control method according to claim 14, further comprising:

when the current corresponding to the braking force in accordance with the driver's braking will exceeds the reference value, performing a second braking such that the first power generating unit is supplied with the maximum current and the second power generating unit is driven by the current calculated in the determining braking force.

16. The control method according to claim 15, further comprising:

correcting a second braking force by comparing a predicted rotation value of the rotational axis of the second power generating unit based on the current supplied through the determining braking force with an actual rotation value sensed through the relative angle sensor of the second power generating unit.

17. The control method according to claim 14, further comprising:

correcting a first braking force by comparing a predicted rotation value of the rotational axis of the first power generating unit based on the current supplied through the determining braking force with an actual rotation value sensed through a relative angle sensor of the first power generating unit.

18. The control method according to claim 14, further comprising:

determining a downhill such that a braking time in accordance with the driver's braking will is compared with a reference time and when the braking time in accordance with the driver's braking will exceeds the reference time, the current supplied to the first power generating unit is removed and the current calculated to correspond to the braking force in accordance with the driver's braking will is supplied to the second power generating unit.

19. A control method of an electromechanical brake including a brake actuator provided in a disc brake to press or release a piston and controlled by an electrical signal, the control method comprising:

moving a ball pressing the piston through a pressing ramp portion to an initial position of a lowest point as a braking release point;

setting rotational positions of first and second power generating units configured to convert electrical energy into mechanical rotational kinetic energy to a braking initial position after the moving the ball; and applying a parking brake in accordance with a driver's parking will such that a current is supplied only to the second power generating unit in a state where the current supplied to the first power generating unit is removed.

* * * * *